(12) United States Patent
Martínez Chapa et al.

(10) Patent No.: US 11,603,314 B2
(45) Date of Patent: Mar. 14, 2023

(54) NOBLE NANOMETALS EMBEDDED CARBON COMPOSITES, A BOTTOM-UP FABRICATION PROCESS AND DIFFERENT APPLICATIONS

(71) Applicant: Instituto Tecnológico y de Estudios Superiores de Monterrey, Monterrey (MX)

(72) Inventors: Sergio Omar Martínez Chapa, Monterrey (MX); Gaurav Chauhan, Monterrey (MX); Marc J. Madou, Monterrey (MX); Braulio Cárdenas Benítez, Monterrey (MX); Martín Jiménez Moreno, Monterrey (MX)

(73) Assignee: INSTITUTO TECNOLÓGICO Y DE ESTUDIOS SUPERIORES DE MONTERREY, Nuevo León (MX)

( * ) Notice: Subject to any disclaimer, the term of this patent is extended or adjusted under 35 U.S.C. 154(b) by 169 days.

(21) Appl. No.: 16/699,181

(22) Filed: Nov. 29, 2019

(65) Prior Publication Data
US 2020/0165134 A1    May 28, 2020

Related U.S. Application Data

(60) Provisional application No. 62/772,157, filed on Nov. 28, 2018.

(51) Int. Cl.
  *C01B 32/05*   (2017.01)
  *B82Y 10/00*   (2011.01)
  *B82Y 40/00*   (2011.01)
  *B82Y 30/00*   (2011.01)

(52) U.S. Cl.
  CPC ............... *C01B 32/05* (2017.08); *B82Y 10/00* (2013.01); *B82Y 30/00* (2013.01); *B82Y 40/00* (2013.01)

(58) Field of Classification Search
  CPC ......... C01B 32/05; C01B 32/00; B82Y 10/00; B82Y 40/00; B82Y 30/00
  See application file for complete search history.

(56) References Cited

PUBLICATIONS

Ahammad, et al., Pyrlytic preparation of gold nanoparticle-coated taro carbon and its application for the selective detection of dopamine, New J. Chem. 2018; 42: 4543-4552 (Year: 2018).*

Fayemi, et al., Metal Oxide Nanoparticles/Multi-walled Carbon Nanotube Nanocomposite Modified Electrode for the Detection of Dopamine: Comparative Electrochemical Study, J. Biosens. Bioelectron 2015; 6(4), pp. 1-14 (Year: 2015).*

(Continued)

*Primary Examiner* — Daniel C. McCracken
(74) *Attorney, Agent, or Firm* — Nixon & Vanderhye (57) ABSTRACT

Disclosed is a bottom-up synthesis approach for the fabrication of gold nanoparticles composite carbon thin films based on in situ reduction of gold precursor within a photoresist matrix. This provides the possibility to accumulate noble metal nanostructures both on the surface as wells as in the bulk of a tough material like glassy carbon. With several advantages ranging from electronics, catalysis, optics and several other biofuntionalization technologies, this material is like a hybrid. Moreover, fabrication of micro and Nano level structures make it as a CMEMS and BIOMEMS relevant material for wide range of applications.

15 Claims, 10 Drawing Sheets

(56) References Cited

PUBLICATIONS

Chauhan, et al., Nano-spaced Gold on Glassy Carbon Substrate for Controlling Cell Behavior, Adv. Mater. Interfaces 2020; 7: 2000238 (pp. 1-15) (Year: 2020).*

"Pyrolysis," accessed online at https://www.britannica.com/science/pyrolysis on Jan. 6, 2022 (Year: 2022).*

Cubukcu, et al., Examination of performance of glassy carbon paste electrode modified with gold nanoparticle and xanthine oxidase for xanthine and hypoxanthine detection, Talanta 2007; 74: 434-439 (Year: 2007).*

* cited by examiner

NOBLE NANOMETALS EMBEDDED CARBON COMPOSITES, A BOTTOM-UP FABRICATION PROCESS AND DIFFERENT APPLICATIONS

BACKGROUND OF THE INVENTION

Field of the Invention

Carbon materials offer an unrivaled spectrum of properties, thanks to the structural diversity of its allotropes. Tuned by the control of sp3 and sp2 bonds, it is not uncommon to find polar extremes in their traits. For instance, their electronic conductivity can rank from insulating diamond to superconducting graphene. Among these allotropes, Glassy Carbon (GC) has been the most used carbon form in the electrochemical field within the last four decades. It is a desirable electrode material known for its chemical stability within a wide potential window.

Description of Related Art

In recent history, a new discipline known as Carbon MEMS (or C-MEMS) has emerged, where GC is the focus material. In this approach, GC is obtained from the pyrolysis of a photo-defined or electrospun polymeric precursor, avoiding the need of the usual etching steps for patterning. From the angle of materials science, C-MEMS also opens new avenues in the control of GC properties. For example, the selection of pyrolysis parameters and polymeric constituents affect GC degree of graphitization and surface moieties. This flexibility has catch the attention of diverse areas such as biosensing, batteries, neural interfaces, supercapacitors, cell separation and fuel cells.

GC surfaces obtained by pyrolysis are often inert and of closed porosity. Demanding material and surface engineering according to the desired application. For instance, sensors might need a GC with higher kinetics and carboxyl-binding sites. Implantable devices need biodegradability, roughness and adhesive moieties. Super capacitors need high surface area and specific capacitance.

GC Modification for C-MEMS has involved diverse strategies that occur ex situ and in situ. The former one consists of surface changes by thermal, chemical or electrochemical routes. The latter one involves material modification by choosing oligomers, doping or nanostructured additives. Novel techniques for modification have been explored by inducing graphitization with mechanical stresses.

Composite of metal nanoparticles (MNPs) and carbon is another interesting and underexplored approach. Literature presents several examples where metal-based species are used for the functionalization of carbon electrodes but synthesizing metal nanoparticles embedded carbon will open an entirely new direction. Recent studies have shown some approached to synthesize such composites specifically for iron oxide, platinum, zinc oxide and even silver nanoparticles. Most of these synthesis techniques involves either the direct carbonization of electrospun polymer and metal precursor salt mixture in an inert environment, or the post hydrothermal growth of the metal nanoparticles on the carbon nanofibers using specific metal salt precursors. Electrodeposition of metal nanoparticles and template based synthesis, where the terminal functional group of the template was used to load the metallic precursors on the electrode surface and a controlled reduction was performed later to decorate it with metal nanoparticles.

BRIEF SUMMARY OF THE INVENTION

The inventors have developed a bottom-up synthesis approach for the fabrication of gold nanoparticles composite carbon thin films. The technique relies on the in situ reduction of gold precursor within a photoresist matrix and this specification reveals the mechanism behind the concomitant SU8 polymerization and reduction of the metal precursor. The distribution of gold nanoparticles in the solid thin film carbon matrix is a classic representation of simultaneous homogenous and heterogeneous gold nucleation. The growth of nanoparticles under the pyrolytic stress environment at different temperatures explains the major effect of incubation period on the size distribution of nanostructures. This quite controllable and significantly simple approach unlocks the possibility to synthesize noble metal nanostructures both on the surface as wells as in the bulk of a tough material like glassy carbon. The invention covers a wide area of applications ranging from an electronic and electrochemical perspective with enhanced bulk conductivity while also enhancing its surface kinetics. This composite material also provide a wide range of catalysis applications. The comparatively hydrophilic nature and presence of noble metal nanoparticles of the composite surface make it an excellent candidate for bimolecular functionalization using various chemistries. Presence of noble metal nanostructures embedded in and on the carbon surface makes it a highly optically relevant material for surface plasmon resonance (SPR) surface-enhanced Raman spectroscopy (SERS) based sensing.

BRIEF DESCRIPTION OF THE SEVERAL VIEWS OF THE DRAWINGS

FIG. 2. (a, b) High definition backscattered electron emission image of the MNPs present on the top surface of the GC thin films synthesized using 20 mM metal precursor. (c, d) transverse cut section of thin film showing the presence of MNPs embedded in the bulk as well as on the surface. (e) X ray diffraction spectra showing the MNPs specific peaks in MNPs-GC spectra in contrast to GC spectra. (f) EDS spectra of the top surface of MNPs-GC.

FIG. 3. (a, b, c) High-resolution transmission electron microscopy images of MNPs present in the bulk of composite thin films. (c) Also represents the fringe distance of the crystalline nanoparticles, (d) selected area diffraction patterns of these nanoparticles.

FIG. 5 Role of pyrolysis parameters on the nanoparticle synthesis, growth and their distribution pattern. All the stabilized films were pyrolyzed in a furnace (PEO 601, ATV Technologie GmbH, DE) under continuous flow of ultrapure nitrogen at an approximate flow rate of 4,600 sccm. First, the stabilized samples were heated to 300° C. at a rate of 4.5° C./min and maintained at that temperature for one hour. Next, the temperature was increased to 900° C. at a 2.5° C./min ramp rate and held at that temperature for an hour before cooling down to ambient temperature at an approximate rate of 10° C./min.

FIG. 9 (a) Carbon microelectronic mechanical system C-MEMS structure for electrochemical measurements with interdigitated electrodes, working and reference electrodes (b) secondary electron emission SEM image of these electrodes revealing the presence of metal nanoparticles embedded and present on the surface of these electrodes.

FIG. 10 (a) Suspended composite fibers/wires of the composite material on micro-fabricated structures, (b) suspended composite fibers/wires before pyrolysis, (c) secondary electron emission SEM image of suspended composite fibers/wires after pyrolysis and (d) High definition backscattered electron emission image of suspended composite fibers/wires after pyrolysis.

DETAILED DESCRIPTION OF THE INVENTION

Figure 1:
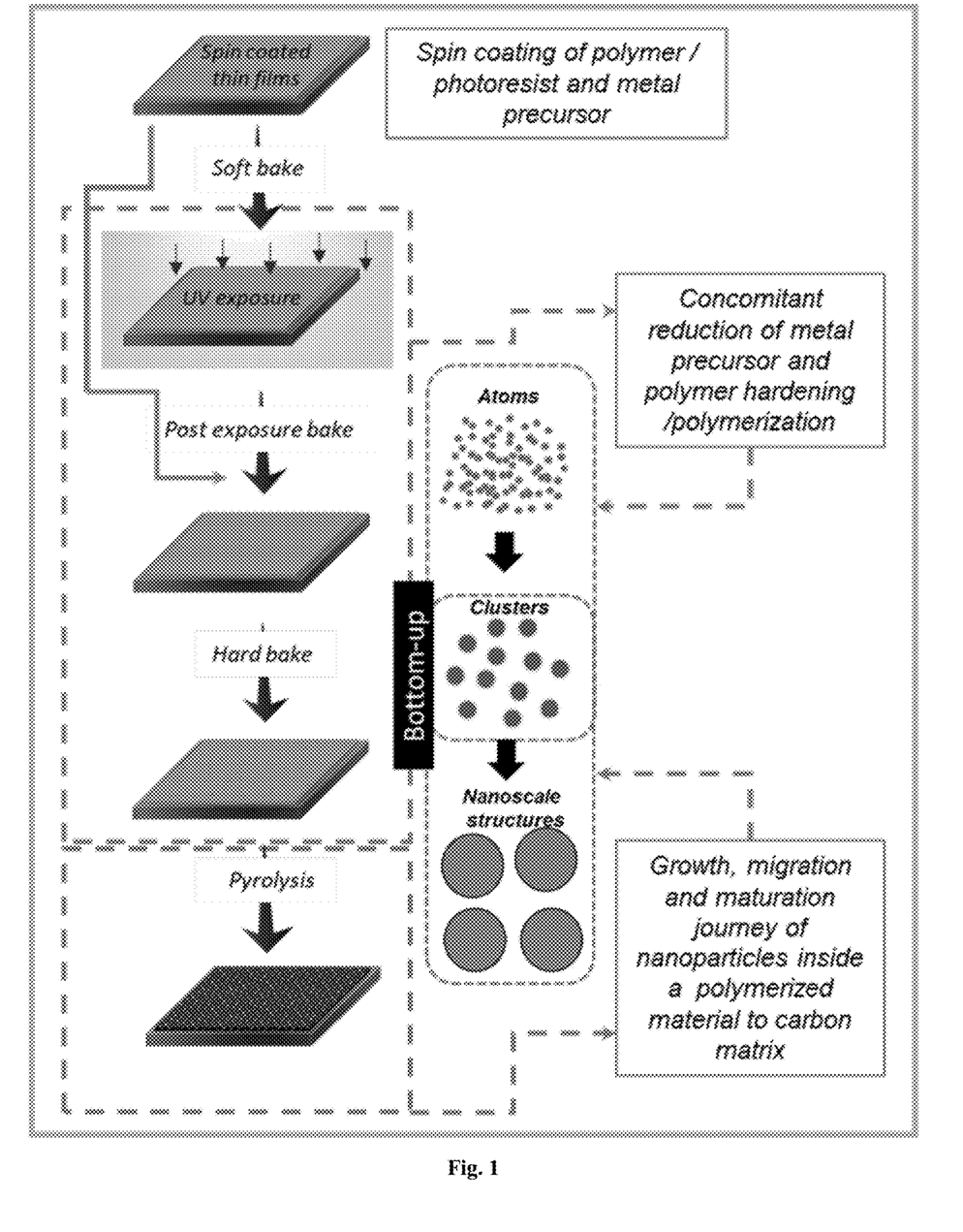
FIG. 1. Schematic of the experimental setup and the step involved in the fabrication of MNPs composite GC.
Figure 2A:
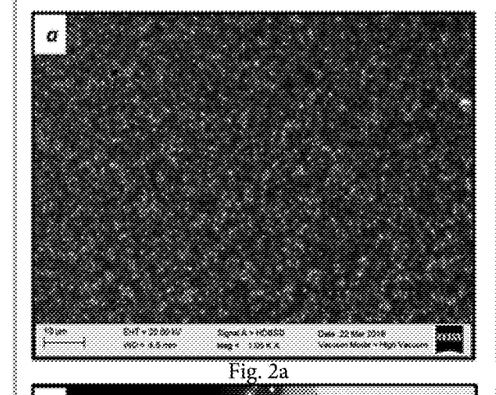
Figure 2B:
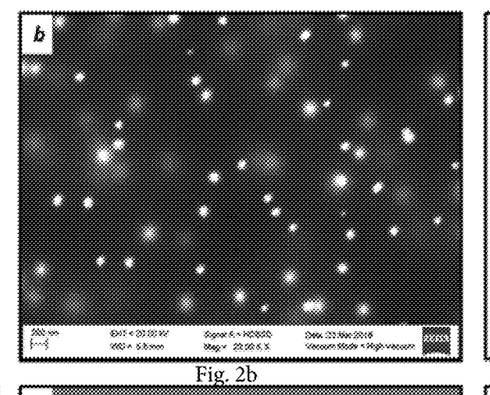
Figure 2C:
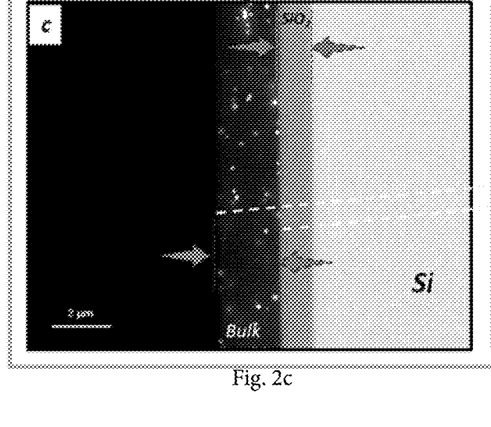
Figure 2D:
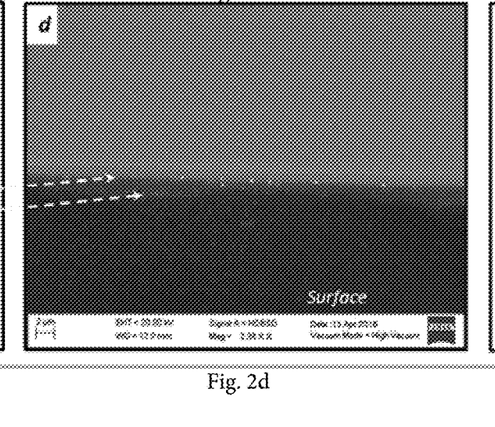
Figure 2E:
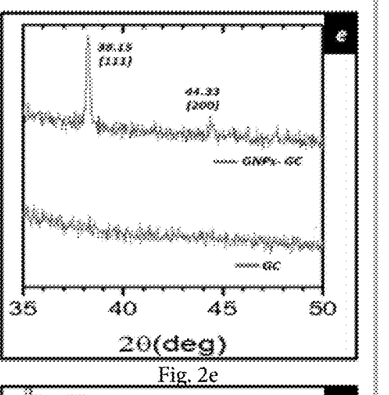
Figure 2F:
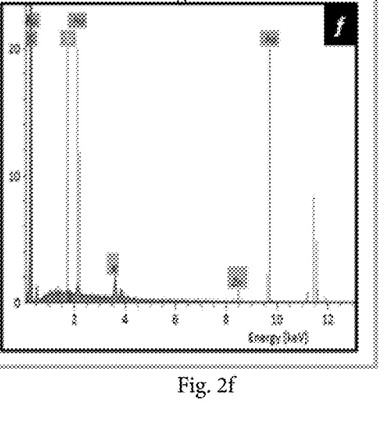

The fabrication process is explained schematically in (FIG. 1). Typical in situ synthesized metal nanoparticles MNPs-GC composite thin films are shown in (FIG. 2). FIG. 2. (a, b) illustrates the surface topography of MNPs-GC composite thin films. Based on the large atomic-number-based contrast difference between gold and the carbon, high definition backscattered electron emission images clearly demonstrates the presence of embedded MNPs in the surface of glassy carbon. In the same SEM mode, cross-section images (FIG. 2c, d) further confirms the presence of MNPs embedded in the bulk of well-defined glassy carbon matrix. X ray diffraction spectra in (FIG. 2e) shows the presence of face centered cubic (FCC) reflections specific to MNPs located at 38.1° and 44.3°. Energy-dispersive X-ray spectroscopy (EDS) performed to check the composition of the thin film material confirms the specific presence of metal, carbon and silicon (FIG. 2e). Complete absence of chlorine in the EDS spectra further explains the complete reduction of the precursor salt.

Figure 3A:
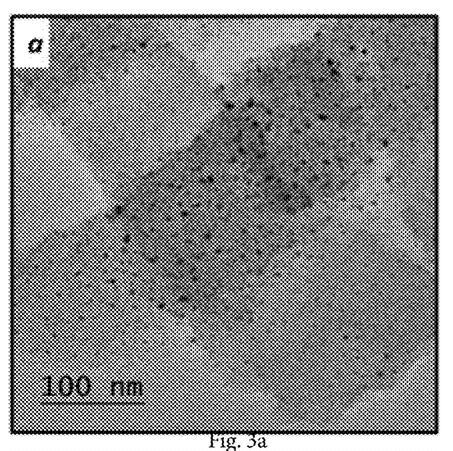
Figure 3B:
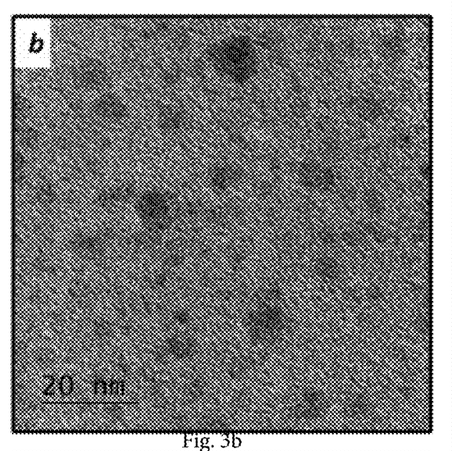
Figure 3C:
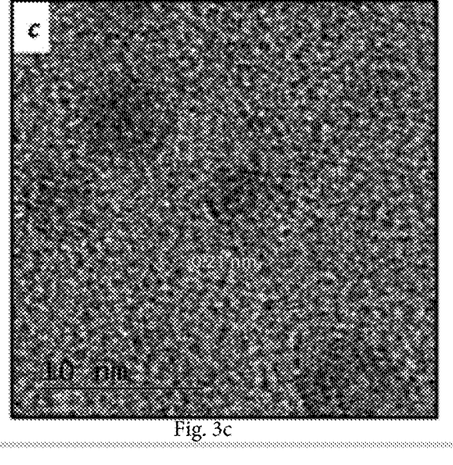
Figure 3D:
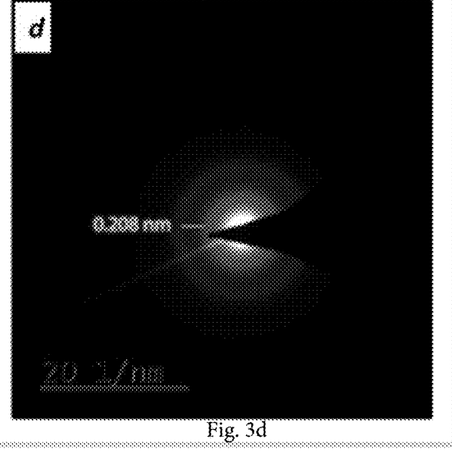
Figure 4:
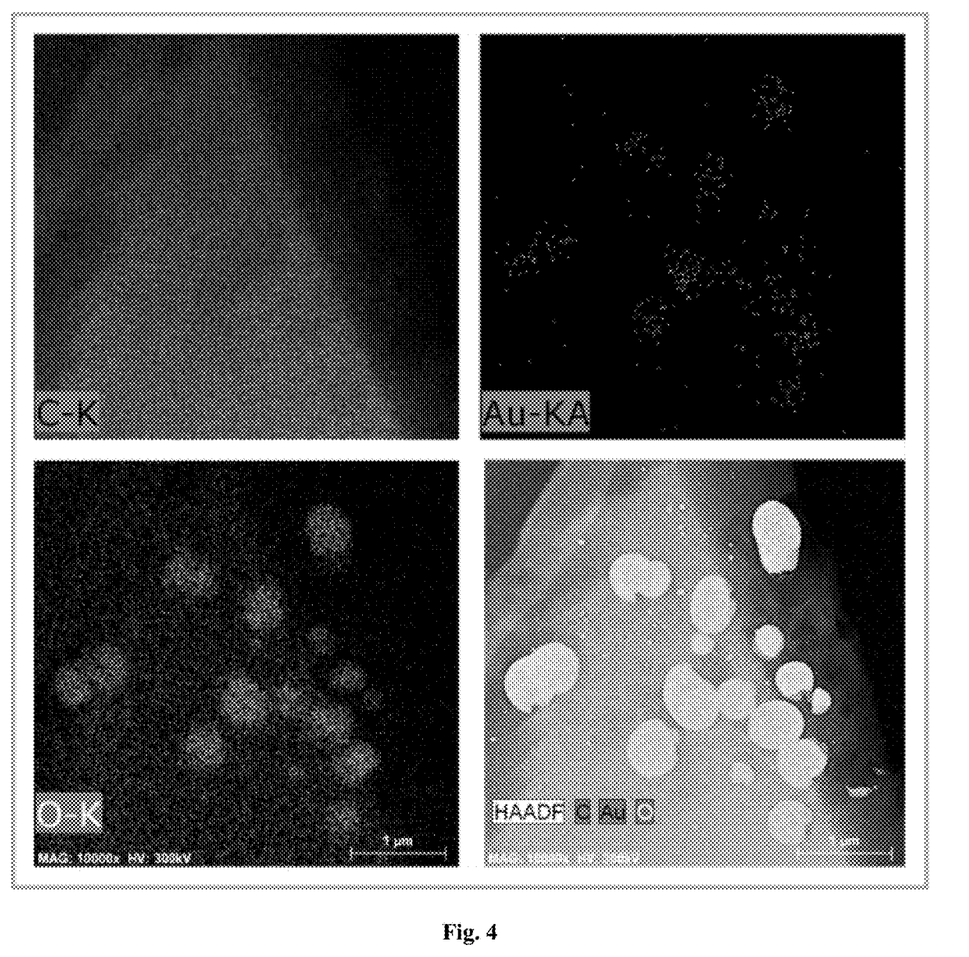
FIG. 4. High-angle annular dark-field, STEM elemental mappings of carbon (C, Green), metal (Au, Red) and oxygen (O, blue) atoms.

High resolution TEM imaging of MNPs embedded in the GC matrix was done by scratching the thin film with diamond cutter tip and suspending the scratched material in ethanol for 20 minutes of sonication. HR-TEM images (FIG. 3a, b) revealed the steric confinement of the MNPs to a size <10 nm, where internal structure of GC or the process precursor of GC (depending on the timing of the nucleation step) restricted the nanostructure migration and thus limiting their growth to such small size. MNPs specific crystalline peaks are further confirmed by HR-TEM and selected area diffraction (SAED) patterns results as shown in (FIG. 3c, d). HR-TEM micrograph (FIG. 3c) shows a MNP with its (200) lattice fringes, while in SAED (FIG. 3d), it displays the rings related to the (111) and (200) reflections from nanoparticles. The crystallinity data of MNPs agrees with XRD results (FIG. 2e), confirming face centered cubic (FCC) reflections of MNPs located at 38.1° (111) and 44.3° (200). STEM elemental mappings of carbon a section of MNPs-GC composite matrix reveled the metal embedded in carbon matrix (FIG. 4). It further revels the presence of oxygen preferentially around the MNPs, which can be explained as the higher affinity of the oxygen toward the nano metal surface.

Tracking the Nanoparticle Growth During Pyrolysis

Figure 5:
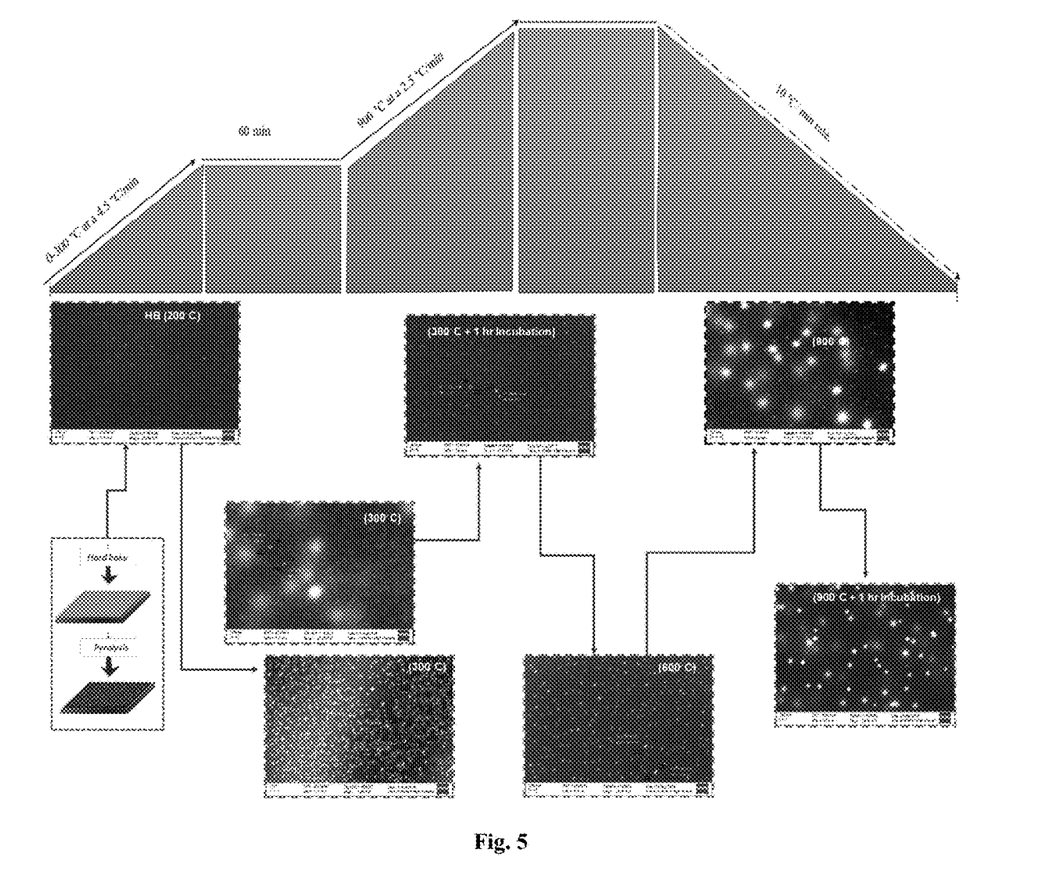

Experiments are performed to understand the growth of nanoparticles during the temperature gradient and incubation periods provided during the carbonization of photoresist. Carbonized films after each step of protocol viz. different temperatures and incubation points are taken and analyzed for nanoparticle distribution. Results revealed the role of rising temperature and reducing environment inside the pyrolysis chamber to upsurge the nanoparticles synthesis and growth inside the hardening matrix. (FIG. 5) represents the changes observed at each halt point in the pyrolysis process. A clear increase in nanoparticle density and size at the initial stages of pyrolysis is observed, afterwards the process moved toward stabilization by virtue of decreasing diffusion in the carbonized matrix. Role of incubation at a constant temperature proves to be vital to narrow down and stabilize the nanoparticle size distribution.

Metal Precursor Concentration and Process Variables

Figure 6:
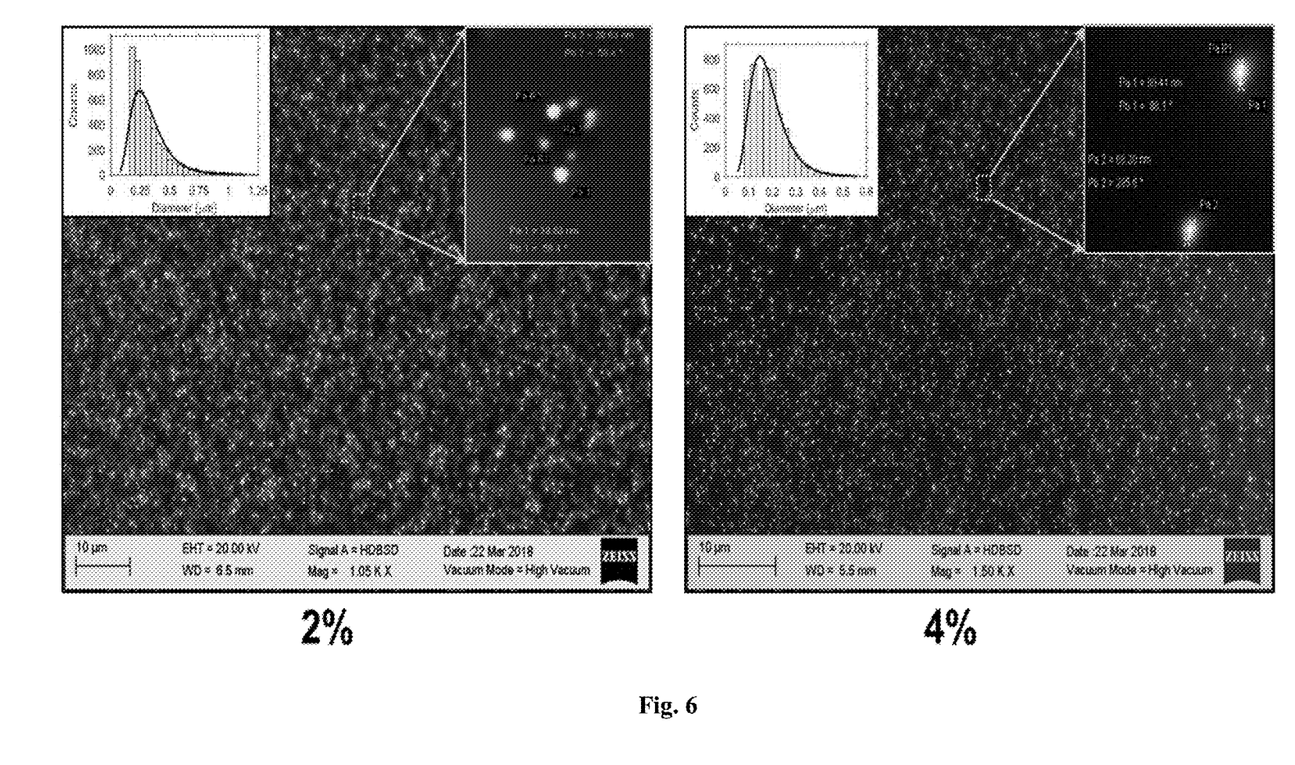
FIG. 6 Nanoparticle distribution with two different precursor metal salt weight percentages in the film composition.
Figure 7:
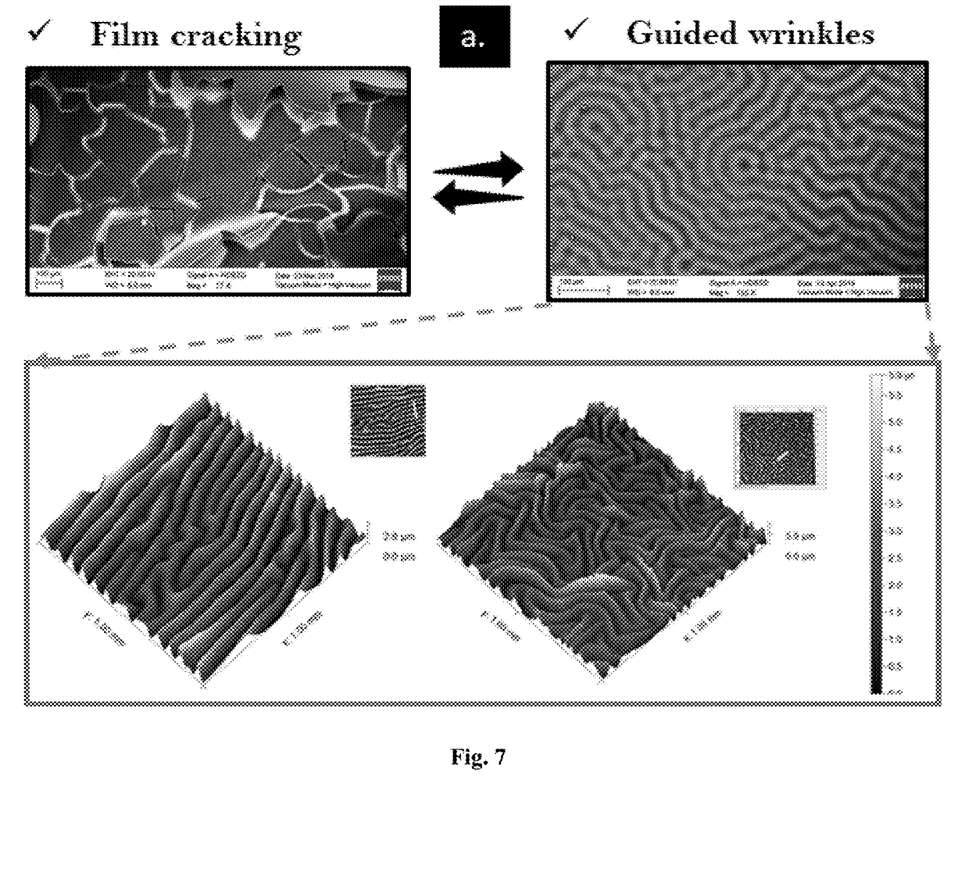
FIG. 7 Gradient photo-crosslinking resulting a kind of pre-cracking stress, resulting in micron-sized wrinkles on the thin films.
Figure 8:
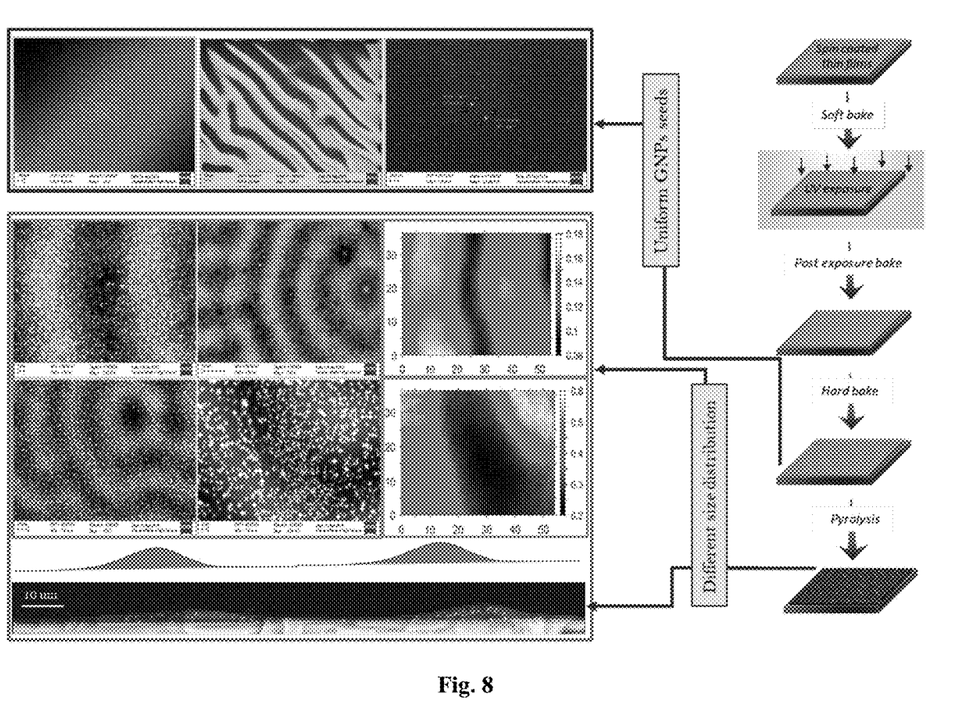
FIG. 8 Gradient photo-crosslinking, resulting in micron-sized wrinkles on the thin film surface before pyrolysis and maturation of these wrinkles during pyrolysis. Wrinkled glassy carbon thin films with organized nanoparticle distribution in the peak and valley region.
Figures 9A, 9B:
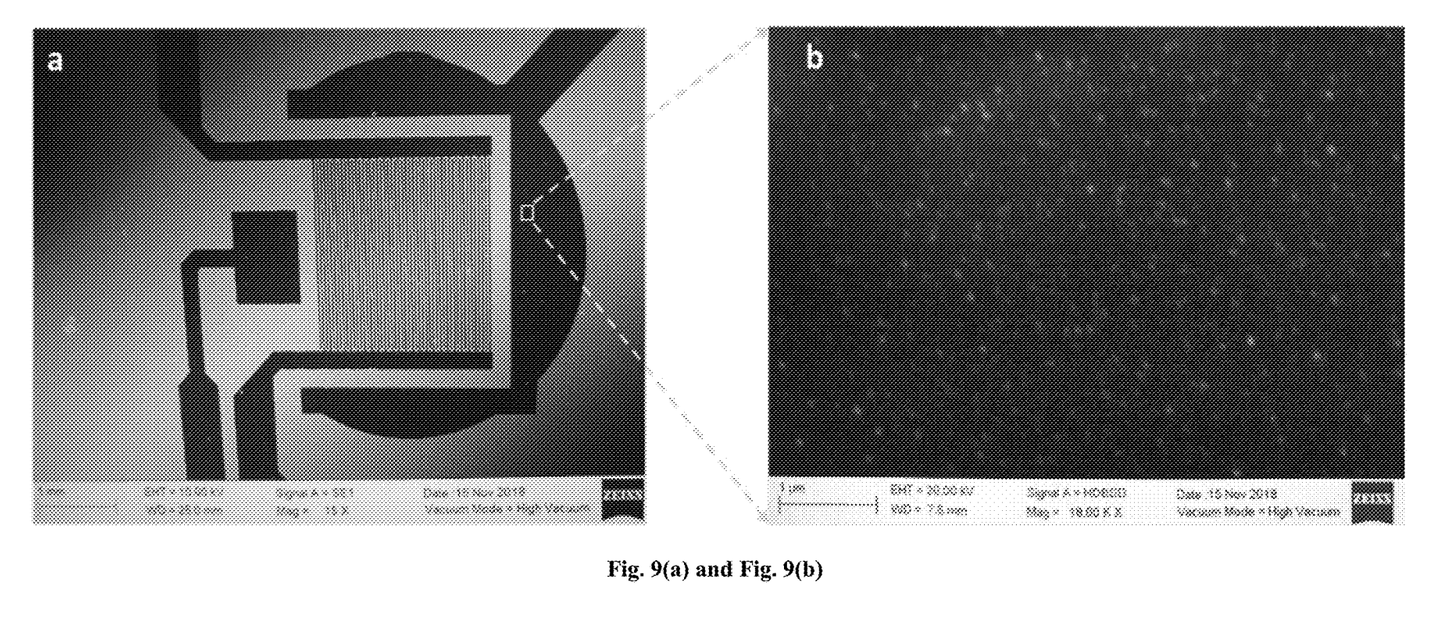
Figure 10A:
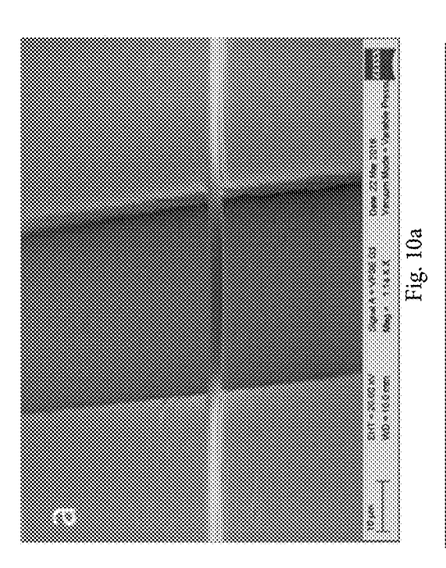
Figure 10B:
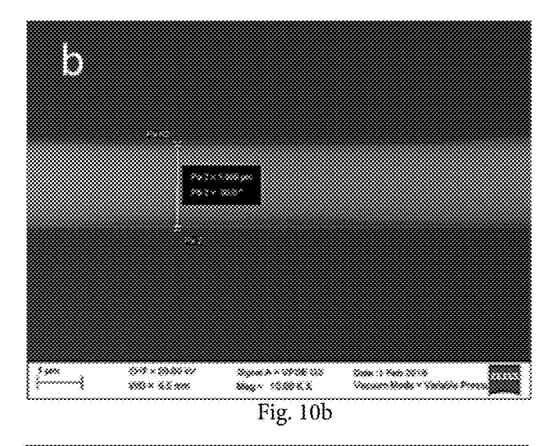
Figure 10C:
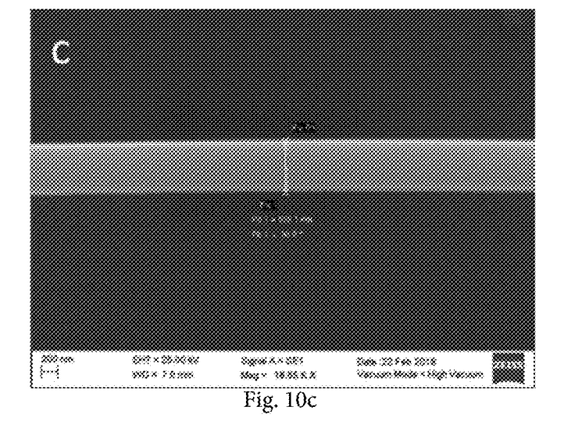
Figure 10D:
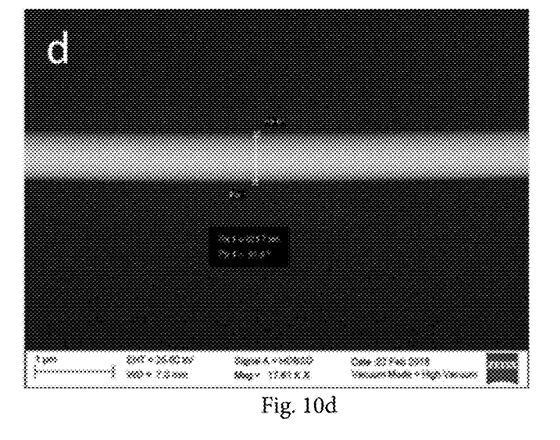

The invention is sensitive to the composition of metal precursor and photoresist composition. A specific range of metal precursor concentration is important to get best thin films characteristics. To mention specifically, this concentration finally governs the nanoparticle's concentration density and size too. Experiments suggests the considerable increase in particle size when the gold salt concentration is doubled (FIG. 6). Further, this precursor concentration also effect the uniformity of Young's modulus of the photoresist polymer across the thin film after the ultraviolet exposure. This effect is termed as gradient photo-crosslinking, resulting in micron-sized wrinkles on the thin film surface before pyrolysis (FIG. 7). These wrinkles are carbonized during pyrolysis and because of carbon origami, with an interesting nanoparticle distribution (FIG. 8). This photo-crosslinking gradient alters the Young's modulus and induce a stress in the film, also recognized as pre-cracking stress. Increasing the thickness of the film eventually increases the Young's modulus difference along the film depth and results in the conversion if this stress into cracks after carbonization. We have also observed the impact of aspect ratio in the surface distribution of this stress and resulting in different morphologies of the wrinkles. Controlling the exposure during the photo-crosslinking process is a key step to control this gradient crosslinking and we can achieve smooth films as well as wrinkled films with different morphologies.

Carbon MEM/NS (Microstructure and Nanostructures) Fabrication

Carbon has been the premiere material for most electrochemical devices because of its high thermal, mechanical and electrochemical stability and good conductivity. Recent advances in Carbon Microelectromechanical system (C-MEMS) fabrication process has addressed the challenges of machining carbon electrodes. This invention incudes the fabrication of C-MEMS microstructure and nanostructures scaled microelectronic devices for wide range of application. Some of these structures like C-MEMS (FIG. 9) nano and microfibers suspended on standard carbon MEMS structure is shown in (FIG. 10).

The invention claimed is:

1. A wrinkled composite of gold nanoparticles and glassy carbon comprising:
   glassy carbon, and
   gold nanoparticles,
      wherein the gold nanoparticles are both embedded within the glassy carbon and on the surface of the glassy carbon,
      wherein the wrinkled composite comprises micron-sized wrinkles on the surface, and
      wherein the wrinkled composite is manufactured by a process comprising:
   providing a gold precursor embedded within a photoresist matrix;
   photo-crosslinking the photoresist matrix embedded with the gold precursor; and
   pyrolysing the crosslinked matrix embedded with the gold precursor.

2. The composite according to claim 1, wherein the composite provides surface conductivity, bulk conductivity, improved capacitance, and surface kinetics for its application as electrically and electrochemically relevant material and sensing electrodes.

3. The composite according to claim 1, wherein the composite provides catalytic performance.

4. The composite according to claim 1, wherein the composite provides a material for surface plasmon resonance, surface Raman spectroscopy based analytical and sensing applications, plasmon waveguides, tunable diffraction gratings and metamaterial based applications.

5. The composite according to claim 1, wherein the composite provides a biocompatible material as a topical material, body implants or inserts for applications including bio-sensing, drug delivery, bone and tissue regeneration and support material, arterial stents, hernia meshes, drug releasing coatings and cell culturing platforms.

6. The composite according to claim 1, wherein the composite is fabricated as films, microelectronic mechanical devices, nano/micro fibers, flakes, powder, nano/micro electrodes and combinations thereof, and wherein a surface of the composite is functionalized with chemical groups/moieties, biological groups/moieties, and combinations thereof.

7. The composite according to claim 6, wherein the surface is functionalized with chemical groups/moieties comprising biodegradable/non biodegradable polymers, dyes, therapeutic chemicals, lipids, cationic/an ionic resins, cheating agents, complexation moieties and combinations thereof.

8. The composite according to claim 6, wherein the chemical groups/moieties and the biological groups/moieties comprise biodegradable/non biodegradable polymers, dyes, therapeutic chemicals, lipids, cationic/an ionic resins, cheating agents, complexation moieties and combinations thereof.

9. The composite according to claim 6, wherein the surface is functionalized with biological groups/moieties comprising proteins, enzymes, antibodies, antigens, peptides, aptamers, nucleotides, nucleotides, human/animal origin cells, microbes, viruses and combinations thereof.

10. The composite according to claim 6, wherein the surface presents a hydrophilic nature to assist controlled functionalization.

11. The composite according to claim 1, wherein the composite is fabricated as films, microelectronic mechanical devices, nano/micro fibers, flakes, powder, nano/micro electrodes and combinations thereof.

12. The composite according to claim 11, wherein the composite provides surface conductivity, bulk conductivity, improved capacitance, and surface kinetics for its application as electrically and electrochemically relevant material and sensing electrodes.

13. The composite according to claim 11, wherein the composite provides catalytic performance.

14. The composite according to claim 11, wherein the composite provides a material for surface plasmon resonance, surface Raman spectroscopy based analytical and sensing applications, plasmon waveguides, tunable diffraction gratings and metamaterial based applications.

15. The composite according to claim 11, wherein the composite provides a biocompatible material as a topical material, body implants or inserts for applications including bio-sensing, drug delivery, bone and tissue regeneration and support material, arterial stents, hernia meshes, drug releasing coatings and cell culturing platforms.

* * * * *